US012787086B2

(12) United States Patent
Hong

(10) Patent No.: US 12,787,086 B2
(45) Date of Patent: Nov. 3, 2026

(54) METHOD AND APPARATUS FOR SETTING UP INTERFACE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 524 days.

(21) Appl. No.: 18/013,963

(22) PCT Filed: Aug. 10, 2020

(86) PCT No.: PCT/CN2020/108140
§ 371 (c)(1),
(2) Date: Dec. 30, 2022

(87) PCT Pub. No.: WO2022/032430
PCT Pub. Date: Feb. 14, 2022

(65) Prior Publication Data

US 2023/0292384 A1 Sep. 14, 2023

(51) Int. Cl.

*H04W 4/00* (2018.01)
*H04W 48/16* (2009.01)
*H04W 76/15* (2018.01)
*H04W 76/30* (2018.01)

(52) U.S. Cl.
CPC .......... *H04W 76/15* (2018.02); *H04W 48/16* (2013.01); *H04W 76/30* (2018.02)

(58) Field of Classification Search
CPC ...... H04W 76/15; H04W 76/30; H04W 48/16
USPC .......................................................... 370/329
See application file for complete search history.

(56) References Cited

U.S. PATENT DOCUMENTS

2012/0270552 A1* 10/2012 Shi .................... H04W 36/0061 455/438
2013/0079053 A1 3/2013 Levien et al.
2013/0080519 A1 3/2013 Levien et al.
2013/0223395 A1* 8/2013 Warken ................ H04W 76/15 370/329
2014/0314050 A1 10/2014 Shindo
2017/0230935 A1* 8/2017 Xu .................. H04W 36/00835
2018/0049088 A1 2/2018 Shiga et al.
2020/0045612 A1* 2/2020 Stauffer ................ H04W 24/10
2021/0235339 A1* 7/2021 Babaei ................. H04W 36/06

FOREIGN PATENT DOCUMENTS

WO WO 2020133209 A1 7/2020

OTHER PUBLICATIONS

Chinese Patent Application No. 202080001789.6, Office Action dated May 7, 2023, 7 pages.
Chinese Patent Application No. 202080001789.6, English translation of Office Action dated May 7, 2023, 14 pages.
European Patent Application No. 20948929.3, Search and Opinion dated Mar. 6, 2024, 11 pages.
Indian Patent Application No. 202347006287, Office Action dated Mar. 2, 2024, 6 pages.

* cited by examiner

*Primary Examiner* — Temica M Beamer
(74) *Attorney, Agent, or Firm* — Cozen O'Connor

(57) ABSTRACT

A method and an apparatus for setting up an interface. The method includes sending first support information of the first base station for multi-modality communication and/or service to a second base station in response to a request by the first base station for setting up an interface with the second base station.

20 Claims, 6 Drawing Sheets

METHOD AND APPARATUS FOR SETTING UP INTERFACE

CROSS REFERENCE TO RELATED APPLICATIONS

This application is a national phase application based on International Application No. PCT/CN2020/108140, filed Aug. 10, 2020, the entire content of which is incorporated by reference for all purposes.

TECHNICAL FIELD

The present disclosure relates to the field of communication technologies, and more particularly, to a method for setting up an interface, an apparatus for setting up an interface.

BACKGROUND

Research on 6th-generation (6G) technology has been put on the agenda as the 5th-generation (5G) technology is officially commercialized. Intelligent interaction is a potentially important application scenario of the 6G technology. Intelligent interaction typically refers to intelligent interaction between agents (such as people and things). Existing interaction between agents is mostly passive which depends on an input of demands. For example, in the case of voice or visual interaction between people and smart homes, the smart homes passively receive data input by people, and the data input is of single modality.

In the 6G era, multi-modality will become a normal state. Inputs of a plurality of devices or a plurality of inputs of one device may be sent to a centralized processing device. For example, the inputs may be sent to a base station first, the base station may process the multi-modality input according to configuration of the base station, and then the base station sends the multi-modality input to the centralized processing device. The centralized processing device processes these inputs comprehensively, to finally obtain one or more outputs meeting user demands. A plurality of outputs may also be output through a plurality of devices or one single device.

SUMMARY

According to a first aspect of embodiments of the present disclosure, there is provided a method for setting up an interface, applicable for a first base station. The method includes:

- sending first support information of the first base station for multi-modality communication and/or service to a second base station in response to a request by the first base station for setting up an interface with the second base station.

According to a second aspect of embodiments of the present disclosure, there is provided a method for setting up an interface, applicable for a second base station. The method includes:

- receiving first support information of a first base station for multi-modality communication and/or service sent by the first base station; and
- determining whether to set up an interface with the first base station according to the first support information.

According to a third aspect of embodiments of the present disclosure, there is provided an apparatus for setting up an interface, applicable for a first base station. The apparatus includes:

- a processor;
- a memory, configured to store instructions executable by the processor;
- wherein the processor is configured to implement sending first support information of the first base station for multi-modality communication and/or service to a second base station in response to a request by the first base station for setting up an interface with the second base station.

BRIEF DESCRIPTION OF THE DRAWINGS

In order to explain the technical solutions in embodiments of the present disclosure more clearly, the drawings described in the embodiments will be briefly introduced below. The diagrams described below only represent some of the embodiments of the present disclosure.

DETAILED DESCRIPTION

The technical scheme in embodiments of the present disclosure will be described clearly and completely in combination with the appended drawings in embodiments of the present disclosure. The embodiments described are only a part of embodiments in the present disclosure, rather than the whole embodiments. On the basis of embodiments of the present disclosure, all other embodiments obtained by those skilled in the art without creative work are within the protection scope of the present disclosure.

Figure 1:
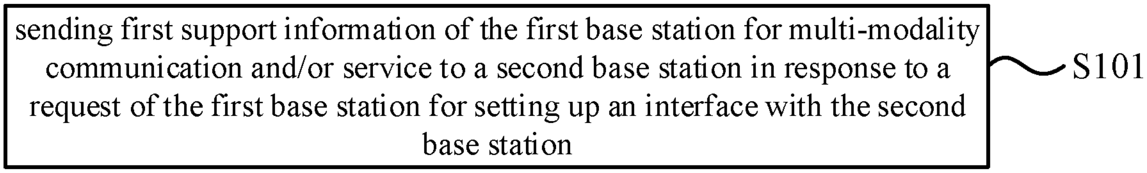
FIG. 1 is a flowchart illustrating a method for setting up an interface according to an embodiment of the present disclosure.

FIG. 1 is a flowchart illustrating a method for setting up an interface according to an embodiment of the present disclosure. The method for setting up the interface illustrated in this embodiment may be applicable to a first base station, which includes but is not limited to base stations in a communication system such as a 4G base station, a 5G base station, a 6G base station, etc. In an embodiment, the first base station may set up an interface with a second base station to which a method for setting up an interface is applicable in subsequent embodiments.

As illustrated in FIG. 1, the method for setting up the interface may include the following steps.

At step S101, first support information of the first base station for multi-modality communication and/or service is sent to a second base station in response to a request by the first base station for setting up an interface with the second base station.

In an embodiment, the base stations may communicate with each other. Generally, in order to communicate, the interface is required to set up first between the base stations. Different base stations may support different multi-modality communication and/or service. Communication between the base stations may have problems for the base stations supported different multi-modality communication and/or service.

For example, the first support information of the first base station for the multi-modality communication and/or service supports A type of multi-modality communication and/or service. That is, the first base station may provide communication support for the A type of multi-modality communication and/or service, specifically, may support communication with network devices, such as a terminal, a core network, and other base stations, for the A type of multi-modality communication and/or service and provide the corresponding service.

The second support information of the second base station for multi-modality communication and/or service supports B type of multi-modality communication and/or service. That is, the second base station may provide communication support for the B type of multi-modality communication and/or service, specifically, may support communication with network devices, such as a terminal, a core network, and other base stations, for the B type of multi-modality communication and/or service and provide the corresponding service.

In this case, assuming that the first base station has set up the interface with the second base station, the first base station and the second base station cannot communicate for the same type of multi-modality communication and/or service and provide the corresponding service because the first base station and the second base station support different multi-modality communication and/or service, which may result in the first base station and the second base station being unable to communicate, thus wasting operations and resources for setting up the interface.

According to an embodiment of the present disclosure, when the first base station requests to set up the interface with the second base station, the first base station may first determine the multi-modality communication and/or service supported by the first base station, generate the first support information according to the multi-modality communication and/or service supported by the first base station, for example, the first support information may indicate a type and a number of the multi-modality communication and/or service supported by the first base station, and then send the first support information to the second base station, to enable the second base station to determine to set up the interface with the first base station according to the first support information.

The second base station may determine the multi-modality communication and/or service supported by the second base station, generate second support information based on the multi-modality communication and/or service supported by the second base station, then compare whether the first support information is the same as the second support information, and further determine whether to set up the interface with the first base station based on a comparison result. It is beneficial to avoid wasting the operations and resources for setting up the interface.

For example, in a case that the first support information is the same as the second support information (may be partially or all the same, which may be set as required), the second base station may determine to communicate with the first base station for the same multi-modality communication and/or service and provide the corresponding service, so as to set up the interface with the first base station. Specifically, the second base station may return an interface setup response signaling to the based station.

Correspondingly, for example, in a case that the first support information is different from the second support information (may be partially or all different, which may be set as required), the second base station may determine not to communicate with the first base station for the same multi-modality communication and/or service and provide the corresponding service, so as not to set up the interface with the first base station. Specifically, the second base station may return an interface setup failure signaling to the based station.

Figure 2:
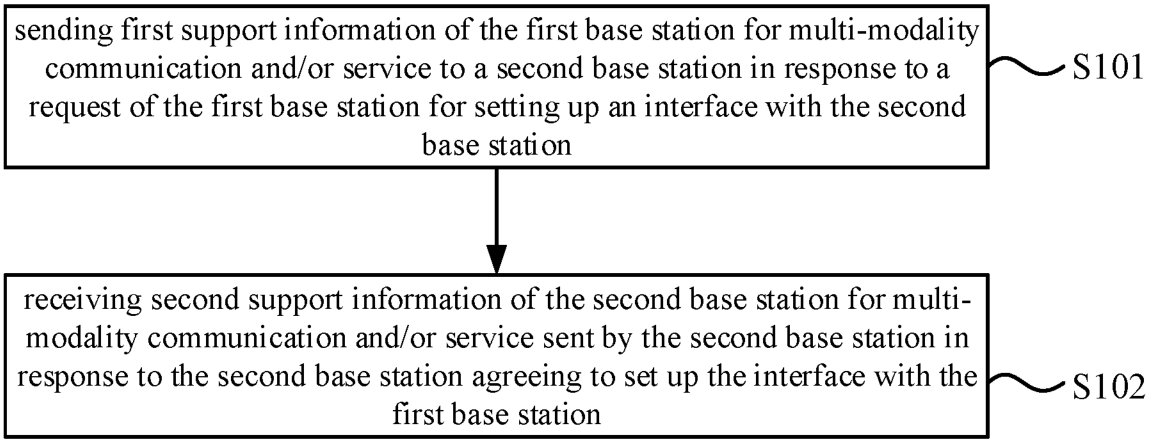
FIG. 2 is a flowchart illustrating another method for setting up an interface according to an embodiment of the present disclosure.

FIG. 2 is a flowchart illustrating another method for setting up an interface according to an embodiment of the present disclosure. As illustrated in FIG. 2, the method may further include the following step.

At step S102, second support information of the second base station for multi-modality communication and/or service sent by the second base station is received in response to the second base station agreeing to set up the interface with the first base station.

In an embodiment, when the second base station agrees to set up the interface with the first base station, the second base station may send the second support information of the second base station for multi-modality communication and/or service to the first base station, to enable the first base station to determine which multi-modality communication and/or service the second base station support.

Optionally, the second support information is carried in an interface setup response signaling sent to the first base station from the second base station.

In an embodiment, the second base station may indicate agreeing to set up the interface with the first base station by sending the interface setup response signaling to the first base station. The second support information may be carried in the interface setup response signaling sent to the first base station. The interface setup request signaling may be as shown in Table 1, where Multi-Modality Support List underlined is the second support information. The second support information may indicate a variety of multi-modality communication and/or service supported by the second base station, therefore the second support information may be represented in the form of a list.

It should be noted that the second base station may determine whether to send the second support information to the first base station according to the first support information and the second support information.

For example, in a case that the first support information is partially the same as the second support information, the second base station may the second support information to the first base station, such that the first base station may determine which multi-modality communication and/or service supported by the second base station are the same as and which are different from the multi-modality communication and/or service supported by the first base station.

For example, in a case that the first support information and the second support information are all the same, the second base station may select not to send the second

TABLE 1

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| <u>Multi-Modality Support List</u> | <u>○</u> | | <u>9.x.x.x</u> | <u>List of supported multi-modality services and associated characteristics.</u> | <u>YES</u> | <u>reject</u> |
| TAI Support List | M | | 9.2.3.20 | List of supported TAs and associated characteristics. | YES | reject |
| List of Served Cells NR | ○ | 0 . . . <maxnoofCellsinNG-RAN node> | | Contains a list of cells served by the gNB. If a partial list of cells is signalled, it contains at least one cell per carrier configured at the gNB | YES | reject |
| >Served Cell Information NR | M | | 9.2.2.11 | | — | |
| >Neighbour Information NR | ○ | | 9.2.2.13 | | — | |
| >Neighbour Information E-UTRA | ○ | | 9.2.2.14 | | — | |
| >Partial List Indicator | ○ | | ENUMERATED (partial, . . . ) | Value "partial" indicates that a partial list of cells is included in the List of Served Cells NR IE | YES | ignore |
| >Cell and Capacity Assistance Information | ○ | | 9.2.2.41 | | YES | ignore |
| List of Served Cells E-UTRA | | 0 . . . <maxnoofCellsinNG-RAN node> | | Contains a list of cells served by the ng-eNB. If a partial list of cells is signalled, it contains at least one cell per carrier configured at the gNB | YES | reject |
| >Served Cell Information E-UTRA | M | | 9.2.2.12 | | — | |
| >Neighbour Information NR | ○ | | 9.2.2.13 | | — | |
| >Neighbour Information E-UTRA | ○ | | 9.2.2.14 | | — | |
| >Partial List Indicator | ○ | | ENUMERATED (partial, . . . ) | Value "partial" indicates that a partial list of cells is included in the List of Served Cells E-UTRA IE | YES | ignore |
| >Cell and Capacity Assistance Information | ○ | | 9.2.2.41 | | YES | ignore |
| Criticality Diagnostics | ○ | | 9.2.3.3 | | YES | ignore |
| AMF Region Information | ○ | | 9.2.3.83 | Contains a list of all the AMF Regions to which the NG-RAN node belongs. | YES | reject |
| Interface Instance Indication | ○ | | 9.2.2.39 | | YES | reject |
| TNL Configuration Info | ○ | | 9.2.3.96 | | YES | ignore |

| Range bound | Explanation |
|---|---|
| maxnoofCellsinNG-RAN node | Maximum no. cells that can be served by a NG-RAN node. Value is 16384. |

support information to the first base station. For example, the above interface setup request signaling does not carry the second support information, thus implicitly indicating the first base station that the first support information and the second support information are all the same.

Figure 3:
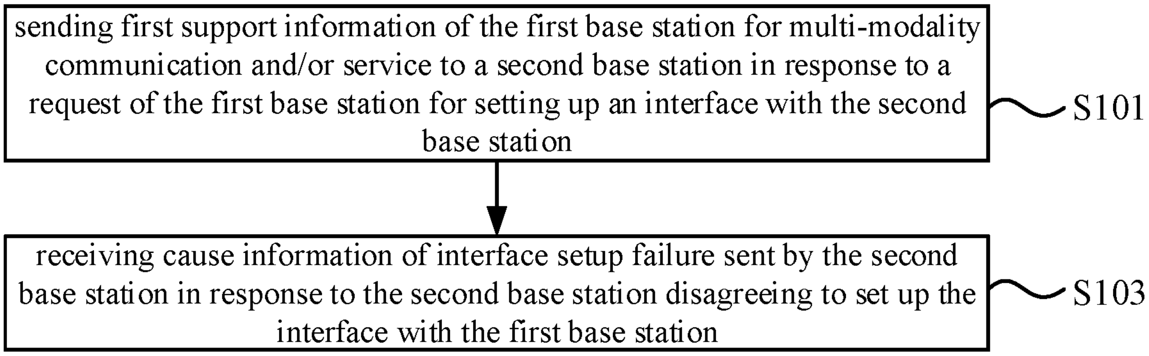
FIG. 3 is a flowchart illustrating yet another method for setting up an interface according to an embodiment of the present disclosure.

FIG. 3 is a flowchart illustrating yet another method for setting up an interface according to an embodiment of the present disclosure. As illustrated in FIG. 3, the method may further include the following step.

At step S103, cause information of interface setup failure sent by the second base station is received in response to the second base station declining to set up the interface with the first base station.

In an embodiment, when the second base station declines to set up the interface with the first base station, the second base station may send the cause information of interface setup failure to the first base station, such that the first base station may determine why the setup of the interface with the second base station is failed.

Optionally, the cause information is carried in an interface setup failure signaling sent to the first base station from the second base station.

In an embodiment, the second base station may indicate declining to set up the interface with the first base station by sending the interface setup failure signaling to the first base station. The cause information of interface setup failure may be carried in the interface setup failure signaling sent to the first base station.

The cause information may be carried in a cause signaling of the interface setup failure signaling. The cause signaling may be as shown in Table 2, where Multi-Modality not supported by NG-RAN underlined is the cause information, indicating that the second base station does not support the multi-modality communication and/or service supported by the first base station.

TABLE 2

| IE/Group Name | Presence | Range | IE Type and Reference | Semantics Description |
|---|---|---|---|---|
| CHOICE Cause Group | M | | | |
| >Radio Network Layer | | | | |
| >>Radio Network Layer Cause | M | | ENUMERATED<br>(<br>Cell not Available,<br>Handover Desirable for Radio Reasons,<br>Handover Target not Allowed,<br>Invalid AMF Set ID,<br>No Radio Resources Available in Target Cell,<br>Partial Handover,<br>Reduce Load in Serving Cell,<br>Resource Optimisation Handover,<br>Time Critical Handover,<br>$TXn_{RELOCoverall}$ Expiry,<br>$TXn_{RELOCprep}$ Expiry,<br>Unknown GUAMI ID,<br>Unknown Local NG-RAN node UE XnAP ID,<br>Inconsistent Remote NG-RAN node UE XnAP ID,<br>Encryption And/Or Integrity Protection Algorithms Not Supported,<br>Protection Algorithms Not Supported,<br>Multiple PDU Session ID Instances,<br>Unknown PDU Session ID,<br>Unknown QoS Flow ID,<br>Multiple QoS Flow ID Instances,<br>Switch Off Ongoing,<br>Not supported 5QI value,<br>$TXn_{DCoverall}$ Expiry,<br>$TXn_{DCprep}$ Expiry,<br>Action Desirable for Radio Reasons,<br>Reduce Load,<br>Resource Optimisation,<br>Time Critical action,<br>Target not Allowed,<br>No Radio Resources Available,<br>Invalid QoS combination,<br>Encryption Algorithms Not Supported,<br>Procedure cancelled,<br>RRM purpose,<br>Improve User Bit Rate,<br>User Inactivity,<br>Radio Connection With UE Lost,<br>Failure in the Radio Interface Procedure,<br>Bearer Option not Supported,<br>UP integrity protection not possible, UP confidentiality protection not possible,<br>Resources not available for the slice(s),<br>UE Maximum integrity protected data rate reason,<br>CP Integrity Protection Failure,<br>UP Integrity Protection Failure, | |

TABLE 2-continued

| IE/Group Name | Presence | Range | IE Type and Reference | Semantics Description |
|---|---|---|---|---|
| | | | MN Mobility, SN Mobility, Count reaches max value, Unknown Old NG-RAN node UE XnAP ID, PDCP Overload, DRB ID not available, Unspecified, . . . , UE Context ID not known, Non-relocation of context, Multi-Modality not supported by NG-RAN) | |
| >Transport Layer | | | | |
| >>Transport Layer Cause | M | | ENUMERATED (Transport Resource Unavailable, Unspecified, . . . ) | |
| >Protocol | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . . ) | |
| >Misc | | | | |
| >>Miscellaneous Cause | M | | ENUMERATED (Control Processing Overload, Hardware Failure, O&M Intervention, Not enough User Plane Processing Resources, Unspecified, . . . ) | |

It should be noted that the cause information may set a representation as required. For example, the cause information shown in Table 2 may describe that the second base station does not support the multi-modality communication and/or service supported by the first base station, or may be an identifier corresponding to the multi-modality communication and/or service supported by the second base station. By sending the identifier to the first base station, the first base station may determine, based on the identifier, the cause of interface setup failure is that the multi-modality communication and/or service supported by the second base station is different from the multi-modality communication and/or service supported by the first base station.

Optionally, the cause information includes the multi-modality communication and/or service supported by the second base station being different from the multi-modality communication and/or service supported by the first base station.

Optionally, the cause information includes the multi-modality communication and/or service supported by the second base station being partially different from or all different from the multi-modality communication and/or service supported by the first base station.

Optionally, the cause information includes the second base station supporting target multi-modality communication and/or service, and the first base station not supporting the target multi-modality communication and/or service.

In an embodiment, the second base station may determine under what scenario setting up the interface with the first base station would be declined. For example, when the first support information is different from the second support information, the second base station may determine that the multi-modality communication and/or service supported by the second base station are different from the multi-modality communication and/or service supported by the first base station. Then, the second base station may send the cause information of the failure to set up the interface to the first base station, to inform the first base station through the cause information that the cause of interface setup failure is that the multi-modality communication and/or service supported by the second base station are different from the multi-modality communication and/or service supported by the first base station.

The multi-modality communication and/or service supported by the second base station being different from those supported by the first base station may include a variety of situations.

For example, the multi-modality communication and/or service supported by the second base station being different from those supported by the first base station may be that the multi-modality communication and/or service supported by the second base station are all different from the multi-modality communication and/or service supported by the first base station.

For example, the multi-modality communication and/or service supported by the second base station being different from the multi-modality communication and/or service supported by the first base station may be that the multi-modality communication and/or service supported by the second base station is partially different from the multi-modality communication and/or service supported by the first base station.

For example, the multi-modality communication and/or service supported by the second base station being different from the multi-modality communication and/or service supported by the first base station may be that the second base station supports specific multi-modality communication and/or service, such as target multi-modality communication and/or service, but the first base station does not support the target multi-modality communication and/or service.

Optionally, the first support information is carried in an interface setup request signaling sent to the second base station from the first base station.

In an embodiment, the first base station may request to set up the interface with the second base station by sending the interface setup request signaling to the second base station.

The first support information may be carried in the interface setup request signaling sent to the second base station. The interface setup request signaling may be as shown in Table 3. The underlined Multi-Modality Support List is the first Support information. Since the first support information may indicate that the first base station supports a variety of multi-modality communication and/or service, the first support information may be represented in the form of a list.

TABLE 3

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| Multi-Modality Support List | O | | 9.x.x.x | | YES | reject |
| TAI Support List | M | | 9.2.3.20 | List of supported TAs and associated characteristics. | YES | reject |
| AMF Region Information | M | | 9.2.3.83 | Contains a list of all the AMF Regions to which the NG-RAN node belongs. | YES | reject |
| List of Served Cells NR | | 0 . . . <maxnoofCellsin NG-RAN node> | | Contains a list of cells served by the gNB. If a partial list of cells is signalled, it contains at least one cell per carrier configured at the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| >Partial List Indicator | O | | ENUMERATED (partial, . . . ) | Value "partial" indicates that a partial list of cells is included in the List of Served Cells NR IE | YES | ignore |
| >Cell and Capacity Assistance Information | O | | 9.2.2.41 | | YES | ignore |
| List of Served Cells E-UTRA | | 0 . . . <maxnoofCellsin NG-RAN node> | | Contains a list of cells served by the ng-eNB. If a partial list of cells is signalled, it contains at least one cell per carrier configured at the ng-eNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| >Partial List Indicator | O | | ENUMERATED (partial, . . . ) | Value "partial" indicates that a partial list of cells is included in the List of Served Cells E-UTRA | YES | ignore |
| >Cell and Capacity Assistance Information | O | | 9.2.2.41 | | YES | ignore |
| Interface Instance Indication | O | | 9.2.2.39 | | YES | reject |
| TNL Configuration Info | O | | 9.2.3.96 | | YES | ignore |

| Range bound | Explanation |
|---|---|
| maxnoofCellsinNG-RAN node | Maximum no. cells that can be served by a NG-RAN node. Value is 16384. |

Optionally, the interface includes at least one of the following:

an XN interface, and an X2 interface.

In an embodiment, the interface requested by the first base station to be set up with the second base station may include, but not limited to, the XN interface and the X2 interface.

In an embodiment, the second base station may determine a condition for agreeing to set up the interface with the first base station and/or a condition for declining to set up the interface with the first base station based on a type of the interface requested to set up by the first base station. Therefore, it may be flexible to select whether to set up the interface with the first base station for different types of interfaces.

For example, when the type of the interface requested to set up by the first base station is a first type, the condition determined by the second base station for agreeing to set up the interface with the first base station may be that the multi-modality communication and/or service supported by the first base station are partially the same as the multi-modality communication and/or service supported by the second base station; and/or, the condition determined by the second base station for declining to set up the interface with the first base station may be that the multi-modality communication and/or service supported by the first base station are all different from the multi-modality communication and/or service supported by the second base station.

For example, when the type of the interface requested to set up by the first base station is a second type, the condition determined by the second base station for agreeing to set up the interface with the first base station may be that the multi-modality communication and/or service supported by the first base station are all the same as the multi-modality communication and/or service supported by the second base station; and/or, the condition determined by the second base station for declining to set up the interface with the first base station may be that the multi-modality communication and/or service supported by the first base station are partially different from the multi-modality communication and/or service supported by the second base station.

Figure 4:
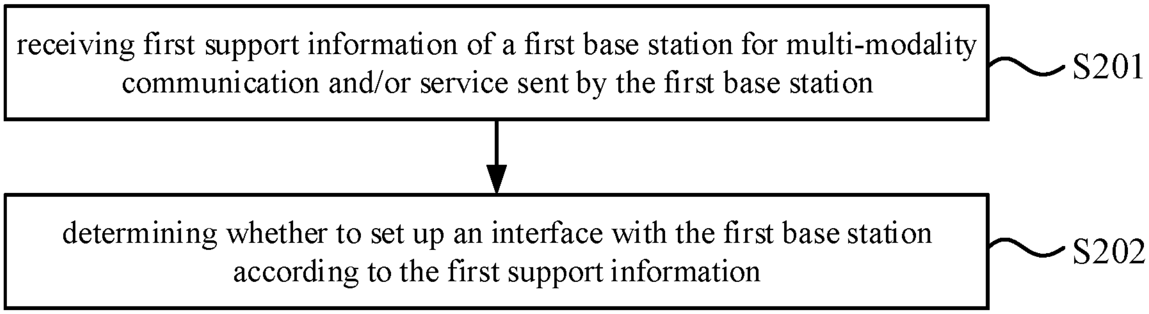
FIG. 4 is a flowchart illustrating a method for setting up an interface according to an embodiment of the present disclosure.

FIG. 4 is a flowchart illustrating a method for setting up an interface according to an embodiment of the present disclosure. The method for setting up the interface illustrated in this embodiment may be applicable to a second base station, which includes but is not limited to base stations in a communication system such as a 4G base station, a 5G base station, a 6G base station, etc. In an embodiment, the second base station may set up the interface with the first base station for which the method for setting up the interface in the foregoing embodiments is applicable.

As illustrated in FIG. 4, the method for setting up the interface may include the following steps.

At step S201, first support information of a first base station for multi-modality communication and/or service sent by the first base station is received.

At step S202, it is determined whether to set up an interface with the first base station according to the first support information.

According to an embodiment of the present disclosure, when the first base station requests to set up the interface with the second base station, the first base station may first determine the multi-modality communication and/or service supported by the first base station, generate the first support information according to the multi-modality communication and/or service supported by the first base station, for example, the first support information may indicate a type and a number of the multi-modality communication and/or service supported by the first base station, and then send the first support information to the second base station, to enable the second base station to determine to set up the interface with the first base station according to the first support information. It is beneficial to avoid wasting operations and resources for setting up the interface.

Figure 5:
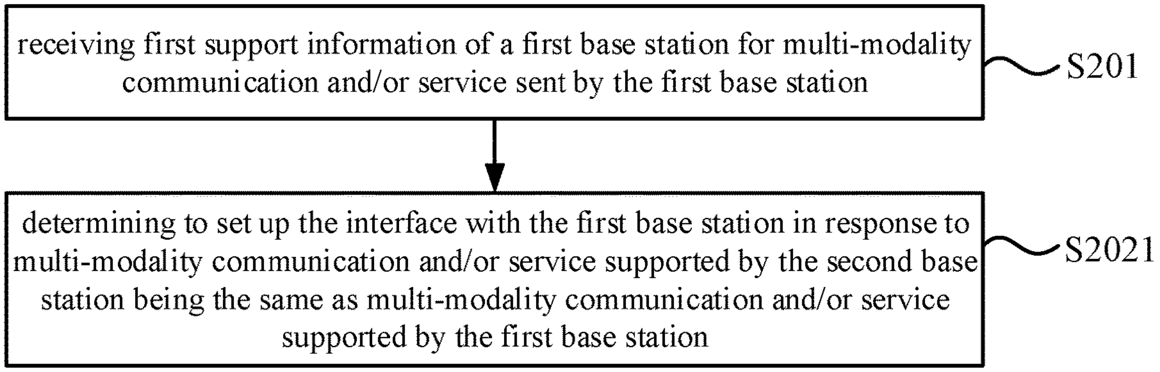
FIG. 5 is a flowchart illustrating another method for setting up an interface according to an embodiment of the present disclosure.

FIG. 5 is a flowchart illustrating another method for setting up an interface according to an embodiment of the present disclosure. As illustrated in FIG. 5, determining whether to set up the interface with the first base station according to the first support information includes the following step.

At step S2021, it is determined to set up the interface with the first base station in response to multi-modality communication and/or service supported by the second base station being the same as multi-modality communication and/or service supported by the first base station.

In an embodiment, the second base station may determine the multi-modality communication and/or service supported by the second base station, generate the second support information based on the multi-modality communication and/or service supported by the second base station, and then determine whether the multi-modality communication and/or service supported by the second base station are the same as the multi-modality communication and/or service supported by the first base station by comparing the first support information and the second support information.

The second base station determines to set up the interface with the first base station in response to the multi-modality communication and/or service supported by the second base station being the same as the multi-modality communication and/or service supported by the first base station. Since the multi-modality communication and/or service supported by the second base station are the same as the multi-modality communication and/or service supported by the first base station, it may be ensured that the first base station and the second base station may communicate and provide the service for the same multi-modality communication and/or service after setting up the interface.

Figure 6:
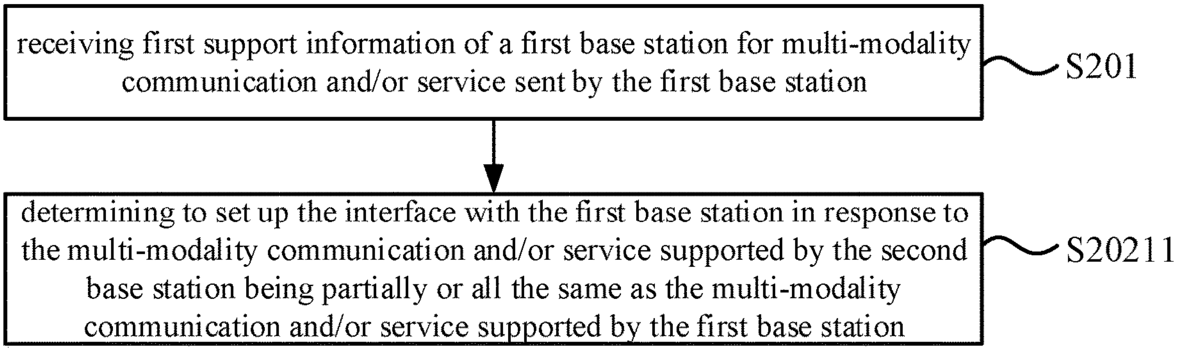
FIG. 6 is a flowchart illustrating yet another method for setting up an interface according to an embodiment of the present disclosure.

FIG. 6 is a flowchart illustrating yet another method for setting up an interface according to an embodiment of the present disclosure. As illustrated in FIG. 6, determining to set up the interface with the first base station in response to the multi-modality communication and/or service supported by the second base station being the same as the multi-modality communication and/or service supported by the first base station includes the following step.

At step S20211, it is determined to set up the interface with the first base station in response to the multi-modality communication and/or service supported by the second base station being partially or all the same as the multi-modality communication and/or service supported by the first base station.

Figure 7:
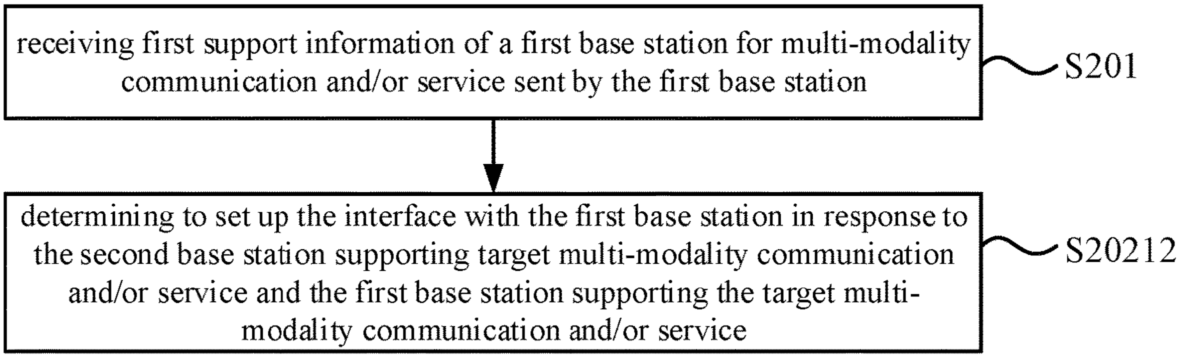
FIG. 7 is a flowchart illustrating still another method for setting up an interface according to an embodiment of the present disclosure.

FIG. 7 is a flowchart illustrating yet another method for setting up an interface according to an embodiment of the present disclosure. As illustrated in FIG. 7, determining to set up the interface with the first base station in response to the multi-modality communication and/or service supported by the second base station being the same as the multi-modality communication and/or service supported by the first base station includes the following step.

At step S20212, it is determined to set up the interface with the first base station in response to the second base station supporting target multi-modality communication and/or service and the first base station supporting the target multi-modality communication and/or service.

In an embodiment, the second base station may determine under what case setting up the interface with the first base station is agreed as required. For example, the second base station may determine to set up the interface with the first base station when the multi-modality communication and/or service supported by the second base station are the same as the multi-modality communication and/or service supported by the first base station.

The multi-modality communication and/or service supported by the second base station being the same as the multi-modality communication and/or service supported by the first base station may include a variety of situations.

For example, the multi-modality communication and/or service supported by the second base station being the same as the multi-modality communication and/or service supported by the first base station may be that the multi-modality communication and/or service supported by the second base station are all the same as the multi-modality communication and/or service supported by the first base station.

For example, the multi-modality communication and/or service supported by the second base station being the same as the multi-modality communication and/or service supported by the first base station may be that the multi-modality communication and/or service supported by the second base station are partially the same as the multi-modality communication and/or service supported by the first base station.

For example, the multi-modality communication and/or service supported by the second base station being the same as the multi-modality communication and/or service supported by the first base station may be that the second base station supports specific multi-modality communication and/or service, such as the target multi-modality communication and/or service, and the first base station also supports the target multi-modality communication and/or service.

Optionally, the first support information is carried in an interface setup request signaling sent to the second base station from the first base station.

Figure 8:
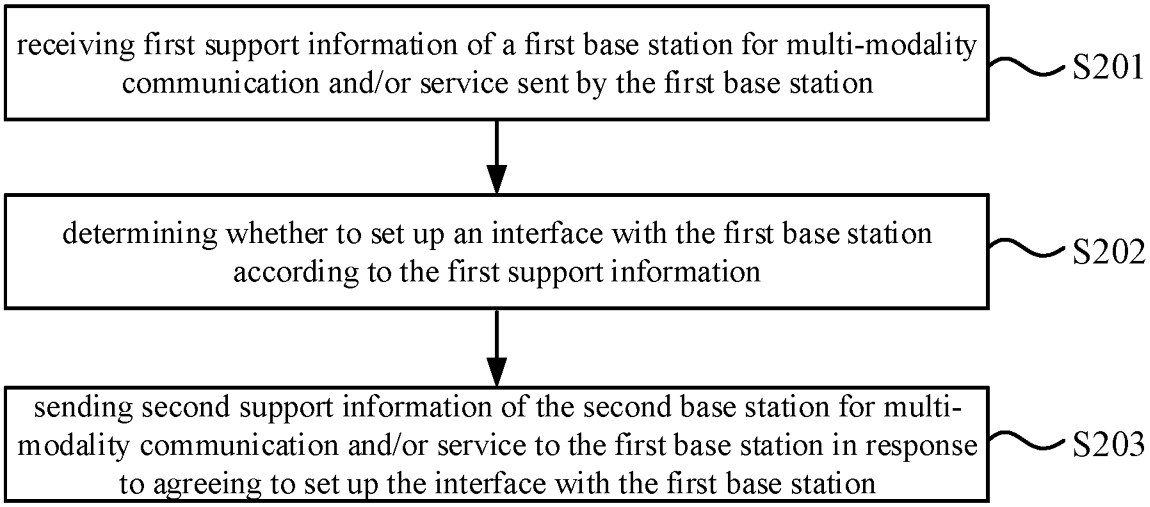
FIG. 8 is a flowchart illustrating still another method for setting up an interface according to an embodiment of the present disclosure.

FIG. 8 is a flowchart illustrating yet another method for setting up an interface according to an embodiment of the present disclosure. As illustrated in FIG. 8, the method may further include the following step.

At step S203, second support information of the second base station for multi-modality communication and/or service is sent to the first base station in response to agreeing to set up the interface with the first base station.

In an embodiment, when the second base station agrees to set up the interface with the first base station, the second base station may send the second support information of the second base station for multi-modality communication and/or service to the first base station, such that the first base station may determine which multi-modality communication and/or service the second base station supports.

Optionally, the second support information is carried in an interface setup response signaling sent to the first base station from the second base station.

In an embodiment, the second base station may indicate agreeing to set up the interface with the first base station by sending the interface setup response signaling to the first base station. The second support information may be carried in the interface setup response signaling sent to the first base station.

Figure 9:
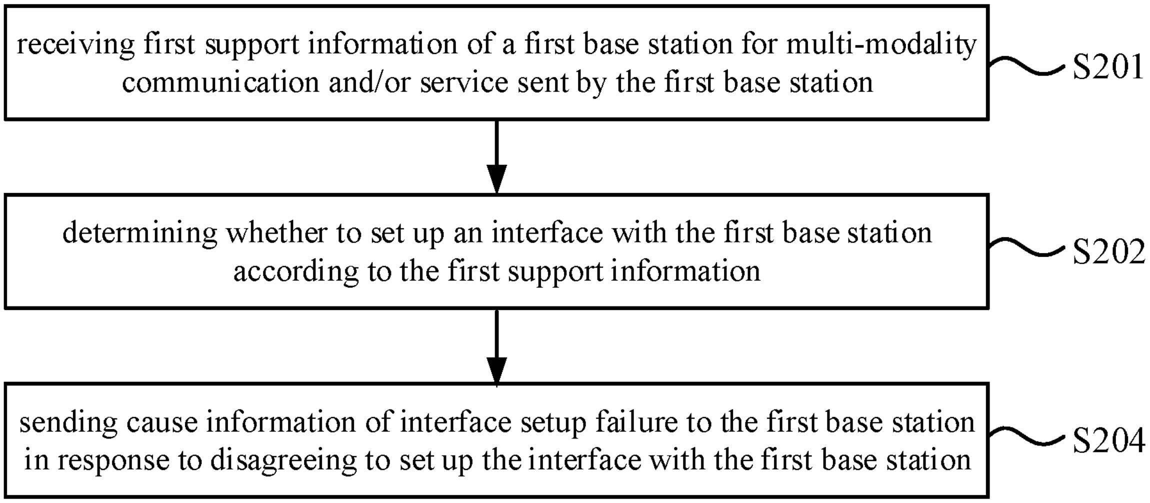
FIG. 9 is a flowchart illustrating still another method for setting up an interface according to an embodiment of the present disclosure.

FIG. 9 is a flowchart illustrating yet another method for setting up an interface according to an embodiment of the present disclosure. As illustrated in FIG. 9, the method may further include the following step.

At step S204, cause information of interface setup failure is sent to the first base station in response to declining to set up the interface with the first base station.

In an embodiment, when the second base station declines to set up the interface with the first base station, the second base station may send the cause information of interface setup failure to the first base station, such that the first base station may determine why the setup of the interface with the second base station is failed.

Optionally, the cause information is carried in an interface setup failure signaling sent to the first base station from the second base station.

In an embodiment, the second base station may indicate declining to set up the interface with the first base station by sending the interface setup failure signaling to the first base station. The cause information of interface setup failure may be carried in the interface setup failure signaling sent to the first base station.

Optionally, the cause information includes the multi-modality communication and/or service supported by the second base station being different from the multi-modality communication and/or service supported by the first base station.

Optionally, the cause information includes the multi-modality communication and/or service supported by the second base station being partially different from or all different from the multi-modality communication and/or service supported by the first base station.

Optionally, the cause information includes the second base station supporting target multi-modality communication and/or service, and the first base station not supporting the target multi-modality communication and/or service.

In an embodiment, the second base station may determine under what scenario setting up the interface with the first base station would be declined. For example, when the first support information is different from the second support information, the second base station may determine that the multi-modality communication and/or service supported by the second base station are different from the multi-modality communication and/or service supported by the first base station. Then, the second base station may send the cause information of the failure to set up the interface to the first base station, to inform the first base station through the cause information that the cause of interface setup failure is that the multi-modality communication and/or service supported by the second base station are different from the multi-modality communication and/or service supported by the first base station.

The multi-modality communication and/or service supported by the second base station being different from those supported by the first base station may include a variety of situations.

For example, the multi-modality communication and/or service supported by the second base station being different from those supported by the first base station may be that the multi-modality communication and/or service supported by the second base station are all different from the multi-modality communication and/or service supported by the first base station.

For example, the multi-modality communication and/or service supported by the second base station being different from the multi-modality communication and/or service supported by the first base station may be that the multi-modality communication and/or service supported by the second base station is partially different from the multi-modality communication and/or service supported by the first base station.

For example, the multi-modality communication and/or service supported by the second base station being different from the multi-modality communication and/or service supported by the first base station may be that the second base station supports specific multi-modality communication and/or service, such as target multi-modality communication and/or service, but the first base station does not support the target multi-modality communication and/or service.

Optionally, the first support information is carried in an interface setup request signaling sent to the second base station from the first base station.

Optionally, the interface includes at least one of the following:

an XN interface, and an X2 interface.

In an embodiment, the interface requested by the first base station to be set up with the second base station may include, but not limited to, the XN interface and the X2 interface.

In an embodiment, the second base station may determine a condition for agreeing to set up the interface with the first base station and/or a condition for declining to set up the interface with the first base station based on a type of the interface requested to set up by the first base station. Therefore, it may be flexible to select whether to set up the interface with the first base station for different types of interfaces.

For example, when the type of the interface requested to set up by the first base station is a first type, the condition determined by the second base station for agreeing to set up the interface with the first base station may be that the multi-modality communication and/or service supported by the first base station are partially the same as the multi-modality communication and/or service supported by the second base station; and/or, the condition determined by the second base station for declining to set up the interface with the first base station may be that the multi-modality communication and/or service supported by the first base station are all different from the multi-modality communication and/or service supported by the second base station.

For example, when the type of the interface requested to set up by the first base station is a second type, the condition determined by the second base station for agreeing to set up the interface with the first base station may be that the multi-modality communication and/or service supported by the first base station are all the same as the multi-modality communication and/or service supported by the second base station; and/or, the condition determined by the second base station for declining to set up the interface with the first base station may be that the multi-modality communication and/or service supported by the first base station are partially different from the multi-modality communication and/or service supported by the second base station.

Figure 10A:
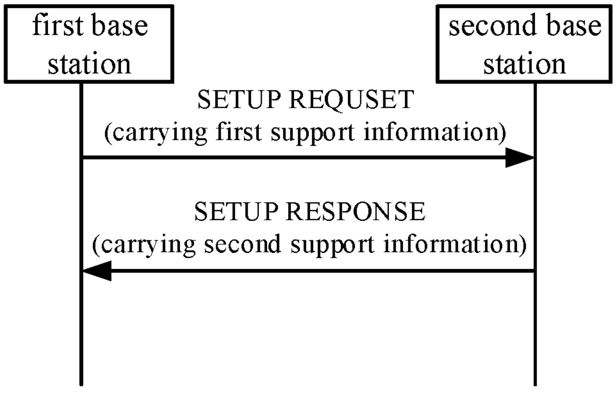
FIG. 10A is a schematic diagram illustrating an interaction between a first base station and a second base station according to an embodiment of the present disclosure.
Figure 10B:
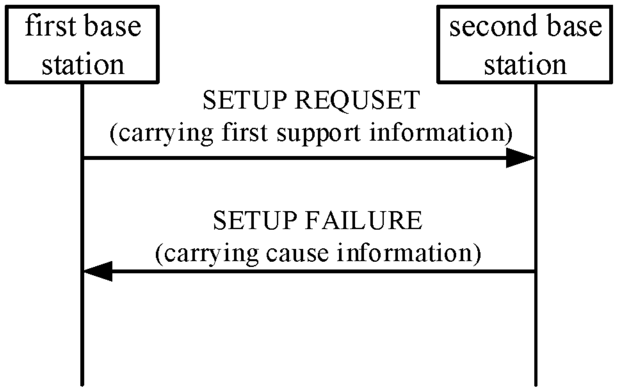
FIG. 10B is a schematic diagram illustrating another interaction between a first base station and a second base station according to an embodiment of the present disclosure.

FIG. 10A is a schematic diagram illustrating an interaction between a first base station and a second base station according to an embodiment of the present disclosure, as illustrated in FIG. 10A. FIG. 10B is a schematic diagram illustrating another interaction between a first base station and a second base station according to an embodiment of the present disclosure, as illustrated in FIG. 10B.

As illustrated in FIG. 10A, in response to the required for setting up the interface with the second base station, the first base station may send the interface setup request signaling to the second base station, and the interface setup request signaling may carry the first support information of the first base station for multi-modality communication and/or service.

After receiving the first support information, the second base station may determine whether to set up the interface with the first base station according to the first support information. In response to agreeing to set up the interface with the first base station, the second base station may send the interface setup response signaling to the first base station, and the interface setup response signaling may carry the second support information of the second base station for multi-modality communication and/or service.

As illustrated in FIG. 10B, in response to the required for setting up the interface with the second base station, the first base station may send the interface setup request signaling to the second base station, and the interface setup request signaling may carry the first support information of the first base station for multi-modality communication and/or service.

After receiving the first support information, the second base station may determine whether to set up the interface with the first base station according to the first support information. In response to the second base station declining to set up the interface with the first base station, the second base station may send the interface setup failure signal to the first base station, and the interface setup failure signal may carry the cause information of the interface setup failure.

Correspondingly to the aforementioned embodiments of the method for setting up the interface, the present disclosure also provides an embodiment of an apparatus for setting up an interface.

Figure 11:
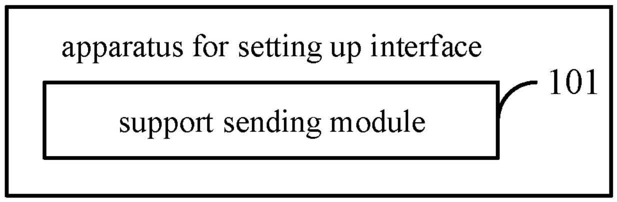
FIG. 11 is a block diagram illustrating an apparatus for setting up an interface according to an embodiment of the present disclosure.

FIG. 11 is a block diagram illustrating an apparatus for setting up an interface according to an embodiment of the present disclosure. The apparatus for setting up the interface illustrated in this embodiment may be applicable to a first base station, which includes but is not limited to base stations in a communication system such as a 4G base station, a 5G base station, a 6G base station, etc. In an embodiment, the first base station may set up an interface with a second base station to which an apparatus for setting up an interface is applicable in subsequent embodiments.

As illustrated in FIG. 11, the apparatus for setting up the interface may include a support sending module 101.

The support sending module 101 is configured to send first support information of the first base station for multi-modality communication and/or service to a second base station in response to a request by the first base station for setting up an interface with the second base station.

Figure 12:
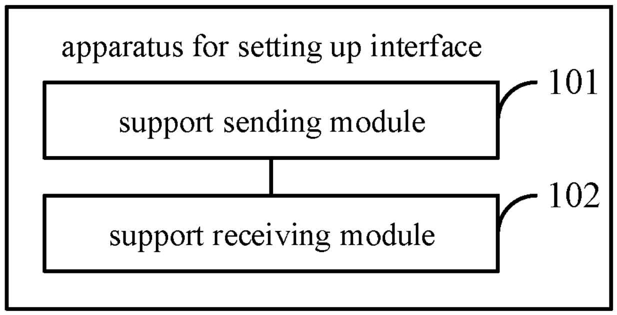
FIG. 12 is a block diagram illustrating another apparatus for setting up an interface according to an embodiment of the present disclosure.

FIG. 12 is a block diagram illustrating another apparatus for setting up an interface according to an embodiment of the present disclosure. As illustrated in FIG. 12, the apparatus may further include a support receiving module 102.

The support receiving module 102 is configured to receive second support information of the second base station for multi-modality communication and/or service sent by the second base station in response to the second base station agreeing to set up the interface with the first base station.

Optionally, the second support information is carried in an interface setup response signaling sent to the first base station from the second base station.

Figure 13:
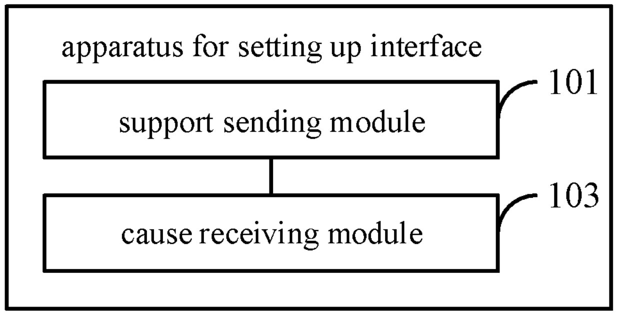
FIG. 13 is a block diagram illustrating yet another apparatus for setting up an interface according to an embodiment of the present disclosure.

FIG. 13 is a block diagram illustrating yet another apparatus for setting up an interface according to an embodiment of the present disclosure. As illustrated in FIG. 13, the apparatus may further include a cause receiving module 103.

The cause receiving module 103 is configured to receive cause information of interface setup failure sent by the second base station in response to the second base station declining to set up the interface with the first base station.

Optionally, the cause information is carried in an interface setup failure signaling sent to the first base station from the second base station.

Optionally, the cause information comprises multi-modality communication and/or service supported by the second base station being different from multi-modality communication and/or service supported by the first base station.

Optionally, the cause information comprises the multi-modality communication and/or service supported by the second base station being partially or all different from the multi-modality communication and/or service supported by the first base station.

Optionally, the cause information comprises the second base station supporting target multi-modality communication and/or service, and the first base station not supporting the target multi-modality communication and/or service.

Optionally, the first support information is carried in an interface setup request signaling sent to the second base station from the first base station.

Optionally, the interface comprises at least one of:

an XN interface and an X2 interface.

Figure 14:
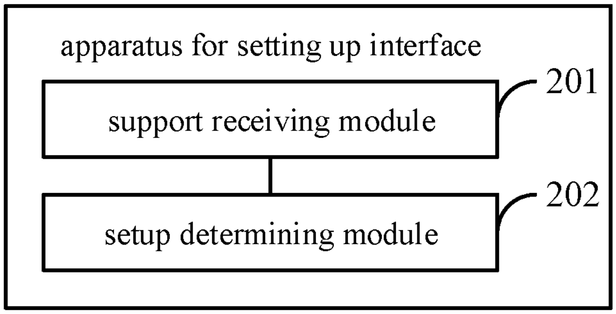
FIG. 14 is a block diagram illustrating an apparatus for setting up an interface according to an embodiment of the present disclosure.

FIG. 14 is a block diagram illustrating an apparatus for setting up an interface according to an embodiment of the present disclosure. The apparatus for setting up the interface illustrated in this embodiment may be applicable to a second base station, which includes but is not limited to base stations in a communication system such as a 4G base station, a 5G base station, a 6G base station, etc. In an embodiment, the second base station may set up the interface with the first base station for which the apparatus for setting up the interface in the foregoing embodiments is applicable.

As illustrated in FIG. 14, the apparatus for setting up the interface may include a support receiving module 201 and a setup determining module 202.

The support receiving module 201 is configured to receive first support information of a first base station for multi-modality communication and/or service sent by the first base station.

The setup determining module 202 is configured to determine whether to set up an interface with the first base station according to the first support information.

Optionally, the setup determining module is configured to determine to set up the interface with the first base station in response to multi-modality communication and/or service supported by the second base station being the same as multi-modality communication and/or service supported by the first base station.

Optionally, the setup determining module is configured to determine to set up the interface with the first base station in response to the multi-modality communication and/or service supported by the second base station being partially or all the same as the multi-modality communication and/or service supported by the first base station.

Optionally, the setup determining module is configured to determine to set up the interface with the first base station in response to the second base station supporting target multi-modality communication and/or service and the first base station supporting the target multi-modality communication and/or service.

Figure 15:
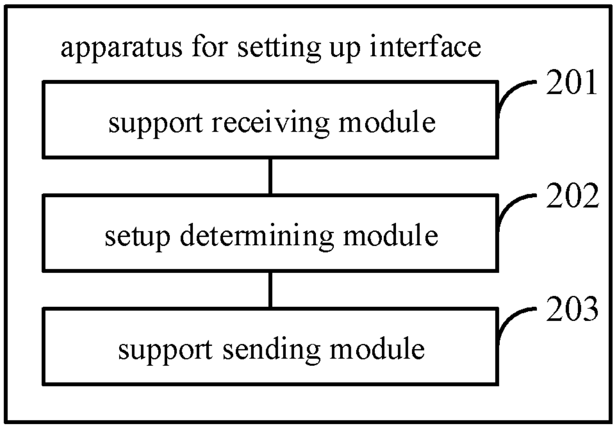
FIG. 15 is a block diagram illustrating another apparatus for setting up an interface according to an embodiment of the present disclosure.

FIG. 15 is a block diagram illustrating another apparatus for setting up an interface according to an embodiment of the present disclosure. As illustrated in FIG. 15, the apparatus may further include a support sending module 203.

The support sending module 203 is configured to send second support information of the second base station for multi-modality communication and/or service to the first base station in response to agreeing to set up the interface with the first base station.

Optionally, the second support information is carried in an interface setup response signaling sent to the first base station from the second base station.

Figure 16:
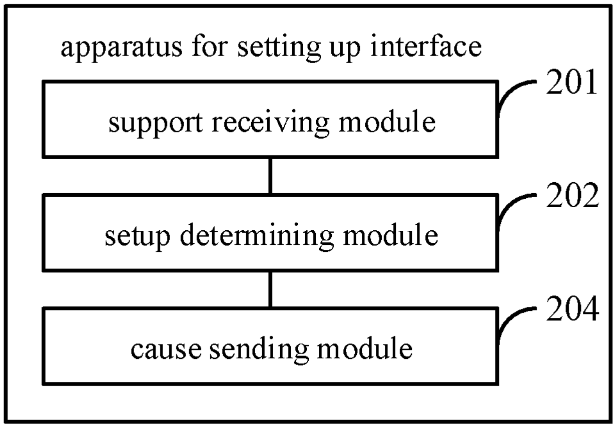
FIG. 16 is a block diagram illustrating yet another apparatus for setting up an interface according to an embodiment of the present disclosure.

FIG. 16 is a block diagram illustrating another apparatus for setting up an interface according to an embodiment of the present disclosure. As illustrated in FIG. 16, the apparatus may further include a cause sending module 204.

The cause sending module 204 is configured to send cause information of interface setup failure to the first base station in response to the second base station declining to set up the interface with the first base station.

Optionally, the cause information is carried in an interface setup failure signaling sent to the first base station from the second base station.

Optionally, the cause information comprises multi-modality communication and/or service supported by the second base station being different from multi-modality communication and/or service supported by the first base station.

Optionally, the cause information comprises the multi-modality communication and/or service supported by the second base station being partially or all different from the multi-modality communication and/or service supported by the first base station.

Optionally, the cause information comprises the second base station supporting target multi-modality communication and/or service, and the first base station not supporting the target multi-modality communication and/or service.

Optionally, the first support information is carried in an interface setup request signaling sent to the second base station from the first base station.

Optionally, the interface comprises at least one of:

an XN interface and an X2 interface.

With regard to the apparatus in the above embodiments, the specific way that each module performs the operation has been described in detail in embodiments of the method and will not be described here.

Embodiments of the apparatus refers to part descriptions of embodiments of the method since embodiments of the apparatus refers basically correspond to embodiments of the method. Embodiments of the apparatus described above are illustrative, in which the above modules described as separate parts may or may not be physically separated, the parts shown as modules may or may not be physical modules, that is, may be located in one place, or may be distributed on a plurality of network modules. Some or all modules may be selected according to actual requirements to achieve the purpose of the present disclosure. Those skilled in the art may understand and implement the present disclosure without any creative effort.

An electronic device is further provided in the disclosure, and includes:

a processor; and a memory configured to store instructions executable by the processor;

the processor is configured to implement the method as described in the above any embodiment.

A computer readable storage medium with a computer program stored thereon is provided in the disclosure. The program implements steps of the method as described in the above any embodiment.

Figure 17:
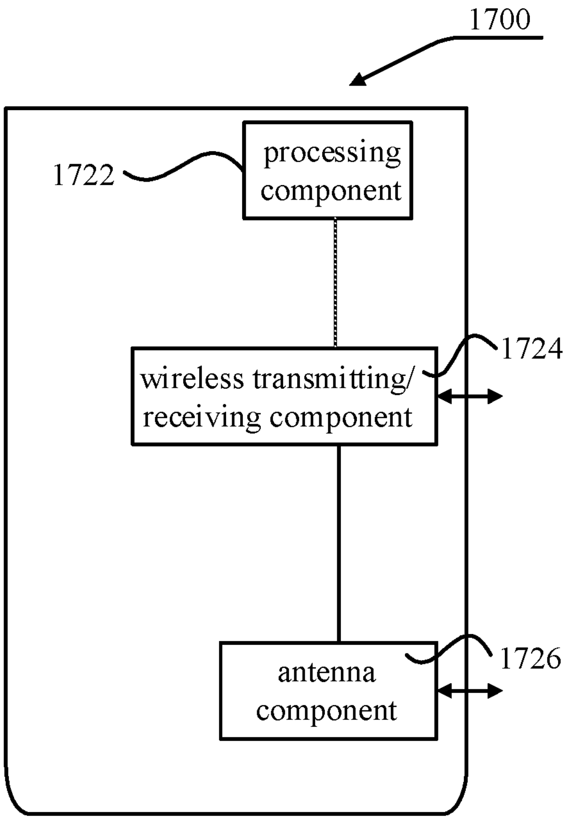
FIG. 17 is a block diagram illustrating a device for setting up an interface according to an embodiment of the present disclosure.

FIG. 17 is a block diagram illustrating a device 1700 for setting up an interface according to an embodiment of the present disclosure. The device 1700 may be provided as a base station, for example, a first base station and/or a second base station. As illustrated in FIG. 17, the device 1700 includes a processing component 1722, a wireless transmitting/receiving component 1724, an antenna component 1726, and a signal processing unit peculiar to a wireless interface, and the processing component 1722 may further include one or more processors. One processor of the processing component 1722 may be configured to implement the method for setting up the interface in the above any embodiment.

After considering the specification and practicing the disclosure herein, those skilled in the art will easily think of other embodiments of the present application. The present application is intended to cover any variations, usages, or adaptive changes of the present application. These variations, usages, or adaptive changes follow the general principles of the present application and include common knowledge or conventional technical means in the technical field not disclosed by the present application. The description and the embodiments are to be regarded as exemplary only, and the true scope and spirit of the present application are referred to the appended claims. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

It should be noted that relational terms such as first and second are used herein to distinguish one entity or operation from another entity or operation without necessarily requiring or implying any such actual relationship or order between such entities or operations. The terms "comprise", "comprising" or any other variations thereof, are intended to cover a non-exclusive inclusion, such that a process, a method, an article or a device including a series of elements not only includes those elements but also includes other elements not expressly listed, or may further include elements inherent to such process, method, article, or device. In the absence of more constraints, the elements defined by a sentence "comprising one" do not preclude the presence of additional same elements in the process, method, article, or apparatus that includes the elements.

The above are detailed descriptions of embodiments of the present disclosure. Specific examples are applied to elaborate principles and implementations of the present disclosure. The descriptions of the above embodiments are only configured to help understand the method and core concepts of the present disclosure; at the same time, for those skilled in the art, there may be changes in the specific implementation and application scope according to the idea of the present disclosure. In summary, the contents of the summary should not be construed as a limitation of the present disclosure.

What is claimed is:

1. A method for setting up an interface, performed by a first base station, the method comprising:

sending first support information of the first base station for multi-modality communication and/or service to a second base station based on a request by the first base station for setting up an interface with the second base station;

receiving a reason for interface setup failure sent by the second base station based on the second base station declining to set up the interface with the first base station, wherein the reason is that multi-modality communication and/or service supported by the second base station is different from multi-modality communication and/or service supported by the first base station, resulting in that the first base station and the second base station cannot communicate for the same type of multi-modality communication and/or service;

wherein reasons that the second base station declines to set up the interface with the first base station are different for different types of interfaces;

in a case where the interface requested to set up by the first base station is a first type of interface, the reason is that the multi-modality communications and/or services supported by the first base station are all different from the multi-modality communications and/or services supported by the second base station, and in a case where the interface requested to set up by the first base station is a second type of interface, the reason is that the multi-modality communications and/or services supported by the first base station are partially different from the multi-modality communications and/or services supported by the second base station.

2. The method according to claim 1, further comprising:

receiving second support information of the second base station for multi-modality communication and/or service sent by the second base station based on the second base station agreeing to set up the interface with the first base station.

3. The method according to claim 2, wherein the second support information is carried in an interface setup response signaling sent to the first base station from the second base station.

4. The method according to claim 1, where the reason is carried in an interface setup failure signaling sent to the first base station from the second base station.

5. The method according to claim 1, wherein the reason comprises the second base station supporting target multi-modality communication and/or service, and the first base station not supporting the target multi-modality communication and/or service.

6. The method according to claim 1, where the first support information is carried in an interface setup request signaling sent to the second base station from the first base station.

7. The method according to claim 1, wherein the interface comprises at least one of an XN interface and an X2 interface.

8. A method for setting up an interface, performed by a second base station, the method comprising:

receiving first support information of a first base station for multi-modality communication and/or service sent by the first base station; and determining whether to set up an interface with the first base station according to the first support information;

sending a reason for interface setup failure to the first base station based on the second base station declining to set up the interface with the first base station, wherein the reason is that multi-modality communication and/or service supported by the second base station is different from multi-modality communication and/or service supported by the first base station, resulting in that the first base station and the second base station cannot communicate for the same type of multi-modality communication and/or service;

wherein reasons that the second base station declines to set up the interface with the first base station are different for different types of interfaces;

in a case where the interface requested to set up by the first base station is a first type of interface, the reason is that the multi-modality communications and/or services supported by the first base station are all different from the multi-modality communications and/or services supported by the second base station, and in a case where the interface requested to set up by the first base station is a second type of interface, the reason is that the multi-modality communications and/or services supported by the first base station are partially different from the multi-modality communications and/or services supported by the second base station.

9. The method according to claim 8, where determining whether to set up the interface with the first base station according to the first support information comprises:

determining to set up the interface with the first base station based on multi-modality communication and/or service supported by the second base station being the same as multi-modality communication and/or service supported by the first base station.

10. The method according to claim 9, wherein determining to set up the interface with the first base station based on the multi-modality communication and/or service supported by the second base station being the same as the multi-modality communication and/or service supported by the first base station comprises:

determining to set up the interface with the first base station based on the multi-modality communication and/or service supported by the second base station being partially or all the same as the multi-modality communication and/or service supported by the first base station.

11. The method according to claim 9, wherein determining to set up the interface with the first base station based on the multi-modality communication and/or service supported by the second base station being the same as the multi-modality communication and/or service supported by the first base station comprises:

determining to set up the interface with the first base station based on the second base station supporting target multi-modality communication and/or service and the first base station supporting the target multi-modality communication and/or service.

12. The method according to claim 8, further comprising:

sending second support information of the second base station for multi-modality communication and/or service to the first base station in response to agreeing to set up the interface with the first base station.

13. The method according to claim 12, wherein the second support information is carried in an interface setup response signaling sent to the first base station from the second base station.

14. The method according to claim 8, wherein the reason is carried in an interface setup failure signaling sent to the first base station from the second base station.

15. The method according to claim 8, wherein the reason comprises the second base station supporting target multi-modality communication and/or service, and the first base station not supporting the target multi-modality communication and/or service.

16. An apparatus for setting up an interface, applicable for a first base station, the apparatus comprising:

a processor;

a memory, configured to store instructions executable by the processor;

wherein the processor is configured to implement:

sending first support information of the first base station for multi-modality communication and/or service to a second base station based on a request by the first base station for setting up an interface with the second base station;

receiving a reason for interface setup failure sent by the second base station based on the second base station declining to set up the interface with the first base station, wherein the reason is that multi-modality communication and/or service supported by the second base station is different from multi-modality communication and/or service supported by the first base station, resulting in that the first base station and the second base station cannot communicate for the same type of multi-modality communication and/or service;

wherein reasons that the second base station declines to set up the interface with the first base station are different for different types of interfaces;

in a case where the interface requested to set up by the first base station is a first type of interface, the reason is that the multi-modality communications and/or services supported by the first base station are all different from the multi-modality communications and/or services supported by the second base station, and in a cast where the interface requested to set up by the first base station is a second type of interface, the reason is that the multi-modality communications and/or services supported by the first base station are partially different from the multi-modality communications and/or services supported by the second base station.

17. The method according to claim 1, further comprising:

receiving second support information of the second base station for multi-modality communication and/or service sent by the second base station based on the second base station agreeing to set up the interface with the first base station and the multi-modality communications and/or services supported by the second base station being partially the same as the multi-modality communications and/or services supported by the first base station, wherein the second support information comprises the multi-modality communications and/or services supported by the second base station;

wherein the second support information is not sent by the second base station based on the second base station agreeing to set up the interface with the first base station and the multi-modality communications and/or services supported by the second base station being all the same as the multi-modality communications and/or services supported by the first base station.

18. The method according to claim 1, wherein the first support information comprises at least one of types or numerical counts of the multi-modality communications and/or services supported by the first base station.

19. The method according to claim 8, further comprising:

sending second support information of the second base station for multi-modality communication and/or service based on the second base station agreeing to set up the interface with the first base station and the multi-modality communications and/or services supported by the second base station being partially the same as the multi-modality communications and/or services supported by the first base station, wherein the second support information comprises the multi-modality communications and/or services supported by the second base station; and not sending the second support information of the second base station for multi-modality communication and/or service based on the second base station agreeing to set up the interface with the first base station and the multi-modality communications and/or services supported by the second base station being all the same as the multi-modality communications and/or services supported by the first base station.

20. The method according to claim 8, wherein the first support information comprises at least one of types or numerical counts of the multi-modality communications and/or services supported by the first base station.

* * * * *